(No Model.) 2 Sheets—Sheet 1.

W. DOIG.
VEHICLE WHEEL.

No. 524,059. Patented Aug. 7, 1894.

WITNESSES.
Wm Munn Andrew.
Geo. N. Jones.

INVENTOR:
William Doig
by Fairfax & Welter
Attorneys (No Model.) 2 Sheets—Sheet 2.
W. DOIG.
VEHICLE WHEEL.

No. 524,059. Patented Aug. 7, 1894.

WITNESSES

INVENTOR:
William Doig
by Fairfax & Ketter
Attorneys

UNITED STATES PATENT OFFICE.

WILLIAM DOIG, OF LONDON, ENGLAND.

VEHICLE-WHEEL.

SPECIFICATION forming part of Letters Patent No. 524,059, dated August 7, 1894.

Application filed November 28, 1893. Serial No. 492,317. (No model.) Patented in England April 10, 1893, No. 7,322; in France October 18, 1893, No. 233,506, and in Germany October 21, 1893, No. 75,794.

*To all whom it may concern:*

Be it known that I, WILLIAM DOIG, a subject of the Queen of Great Britain, residing at London, England, have invented certain new and useful Improvements in Vehicle-Wheels, (for which patents have been granted in Great Britain, No. 7,322, dated April 10, 1893; in France, No. 233,506, dated October 18, 1893, and in Germany, No. 75,794, dated October 21, 1893,) of which the following is a full, clear, and exact specification.

This invention has for its object, to provide a hub with elastic flexible or compressible sides as an efficient substitute for the pneumatic tire used on bicycles and other vehicles for reducing vibration and for increasing the speed. For this purpose I make the circumference of the hub of metal, preferably steel tinned inside, and the sides of flexible and airtight materials connecting the central part of the hub or axle with the circumference of the hub, so as to form between the rigid metallic circumference and the center an airtight annular space or spaces filled or to be filled with compressed air (or other elastic material,) and I provide means to prevent the lateral shifting or oscillation of the hub upon the axle, as the vehicle rolls along.

In further describing the invention, reference will be made to the accompanying drawings, of which—

Figure 2:
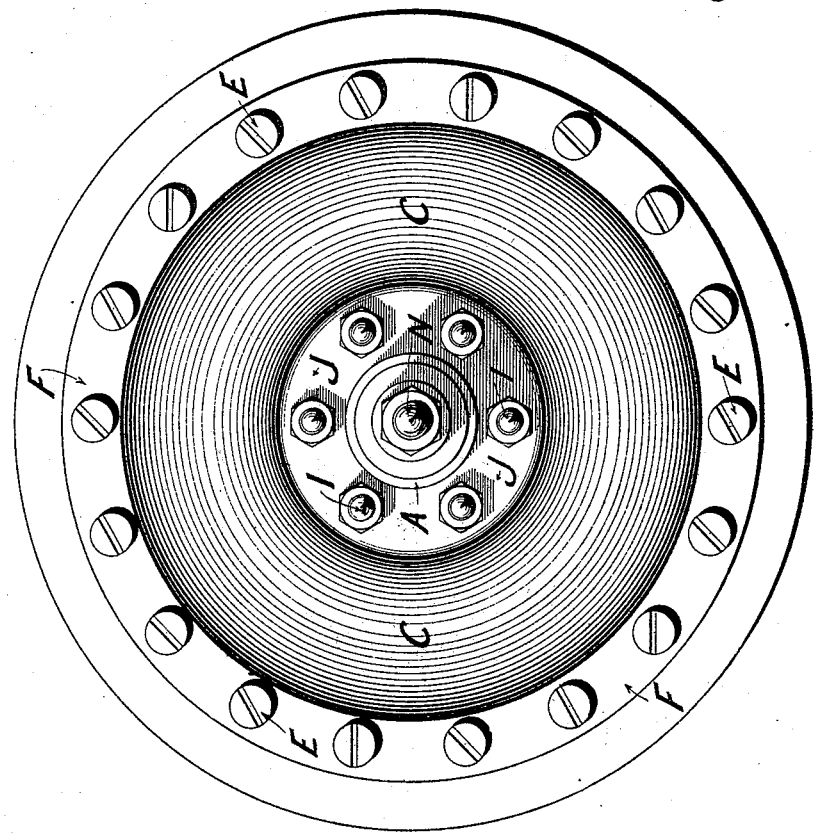
Figure 1:
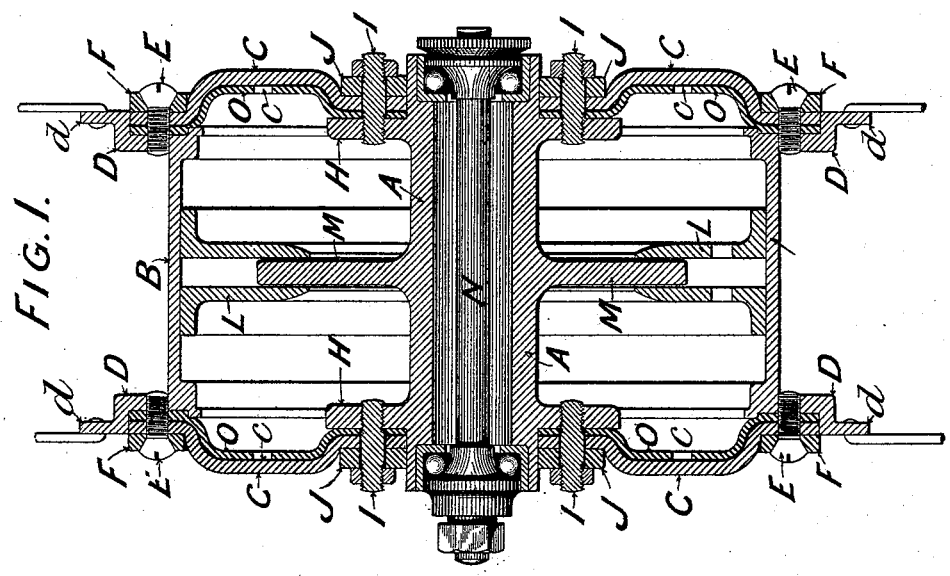
Figure 3:
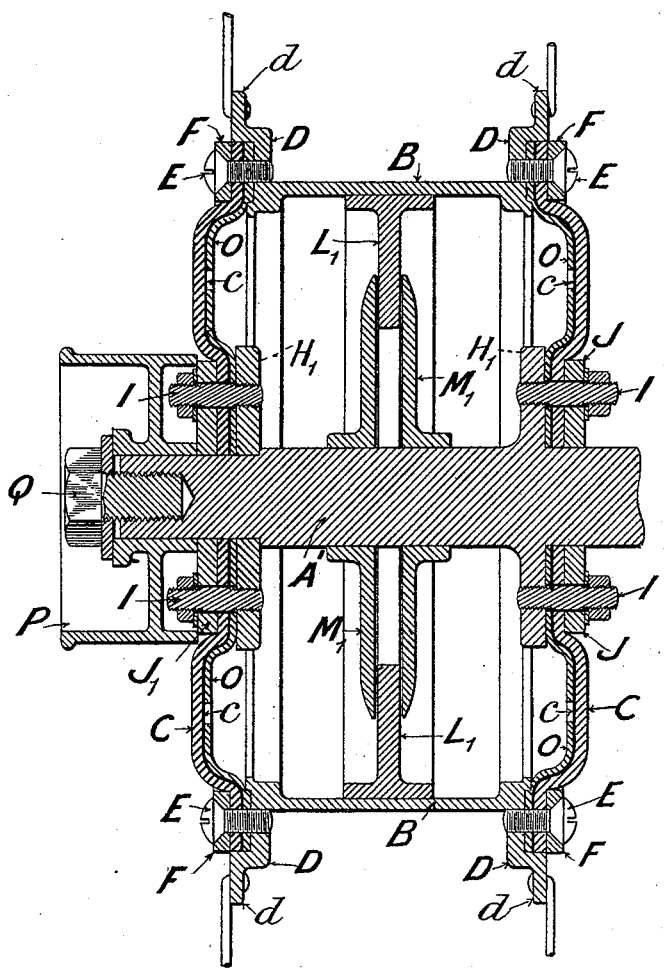

Figure 1 is an axial section of a hub embodying my invention, while Fig. 2 is a face view of the same, and Fig. 3 represents a modification.

A represents the metallic central part or sleeve and B the metallic circumference of the hub.

C are the flexible sides. The flexible sides may be made of leather, canvas, or other material or combination of materials combining the necessary flexibility, elasticity, strength and durability. If the hub is to be filled with compressed air and the sides are not naturally airtight, they are rendered airtight, for instance by lining them with indiarubber, *c*, or other airtight material, as in the case represented by the drawings. They have the shape of annular plates or disks, which may be flat, conical or bulged, but preferably bulged outward, as shown, this shape being most favorable for supplying the necessary elasticity by means of compressed air. The sides are secured to the hub along their outer edges by means of flanges D D, screws E, E, and annular plates or washers F, F. They may, however, be secured by metallic clasps, springs, bolts, rivets, cluthes, or other suitable means. At their inner edges, the said flexible sides, disks or plates, are secured to the central part A, in a similar manner by means of flanges H, screws I and annular washers J. They may be secured, however, by any of the means described above as applicable to the outer edge.

The flanges D may be screwed, brazed, or otherwise secured to the circumference B, or made of one piece with the same, as shown and, if necessary, rendered airtight. The spokes S of the wheel (not shown in Fig. 2) are preferably fixed to a pair of outer flanges *d* made in one piece with the inner flanges D.

Each of the screws or bolts for fixing the flexible sides to the central part and circumference of the hub may be made airtight by coating it with adhesive solution or by other suitable means.

For inflating the sides, or filling the hub with compressed air or other elastic fluid, if required, a suitable valve (or valves) is fitted to the metallic circumference. This valve or valves may be similar to those used for pneumatic tires, and does not form part of my invention.

Owing to the flexible connection between the center and the circumference of the hub, special means must be adopted, to prevent any lateral motion of the hub or its circumference, relatively to the axle, or to keep such motion within given limits, while allowing displacement in a direction radial to the axle. For this purpose, I fit to the inside of the metallic circumference at or near the middle of its length, one or more guide rings or annular plates L, L, which may or may not be perforated, and to the axle a corresponding number of guide rings or plates M which fit against the annular plates L. The drawings show one plate M situated between two perforated plates L, instead of which there may be one plate L, situated between two plates M. These plates or guide rings may, however, be constructed differently from those shown, and need not be placed midway between the sides of the hub.

In order to reduce the friction between the guide rings, one or more of them may be armed with antifriction metal, or with plumbago, soapstone, or other antifriction material, placed in suitable recesses, so as to obtain sliding surfaces similar to those used in oilless shaft bearings. If the clear opening of the end flanges D is less in diameter than the outer guide rings, the latter are composed of several sectors, so that they may be easily introduced into the hub.

The flexible or elastic sides, whether made of leather or other material, or of a combination of materials, are preferably strong enough, to transmit rotary motion from the axle to the hub, which case is represented by the drawings, but such motion may also be transmitted by other means.

In the drawings N represents the axle or spindle, upon which the hub rolls by means of balls and ball bearings, as usual.

O, O, are flexible washers or packing rings interposed between the indiarubber lining of the leather disks C, and the flanges D, H.

Fig. 3 illustrates a modification, in which the hub is fixed on the axle A' so as to revolve with the same, the flanges H', and disk M', being fixed to the axle (or forming part of the same), and the central sleeve or tubular inner part of the hub being omitted.

The lettering of the different parts corresponds to that adopted in Figs. 1 and 2. P is a protecting cap fixed to the end of the axle A' by means of a screw Q, as is the case in many cab wheels. One of the flanges H' is made of one piece with the axle A', and the other is welded to the same.

I am aware, that hollow, elastic or flexible hubs have been made or proposed before, for instance hubs which derive their elasticity from metallic springs, annular indiarubber tubes or a series of hollow rubber balls placed in the interior of the hub. Such hubs are frequently combined with a sliding joint, either between a rigid circumference and rigid sides, or in the sides which are made of two concentric parts of metal adapted to slide upon each other, and in some cases the rotary motion is transmitted by metallic links; but I do not claim any of these devices.

What I claim is—

1. In an air-chambered wheel-hub, the combination of a rigid center and a rigid circumference forming the inner and outer walls of the air chamber, with flexible annular plates serving as sides of the annular air chamber and of the hub, each of the said annular plates being fixed in the middle to the rigid center of the hub and at the outside to the rigid circumference of the same, and adapted to transmit rotary motion between the said parts, substantially as described.

2. In an air chambered wheel hub, the combination of a rigid center and a rigid circumference forming the inner and outer walls of the air chamber, with flexible annular plates serving as sides of the annular air chamber and of the hub, each of the said annular plates being clamped to the said circumference and center by means of flanges, metal rings and screws, so as to transmit rotary motion, substantially as described.

3. In an air-chambered wheel hub, the combination of a rigid center and a rigid circumference forming the inner and outer walls of the air chamber, with flexible annular plates serving as sides of the annular air chamber and of the hub, and internal guide rings adapted to prevent lateral oscillations while allowing radial displacement, the said annular plates being fixed in the middle to the rigid center of the hub and at the outside to the rigid circumference of the same and adapted to transmit rotary motion between the said parts, and the said chamber being made air tight, substantially as described.

4. In an air chambered wheel-hub, the combination of a central sleeve adapted to run on an axle, with a rigid casing connected with the spokes and forming around the said sleeve an annular air chamber, flexible annular plates serving as sides of the said air chamber and of the hub, and internal guide rings adapted to guide the said casing in a plane perpendicular to the hub, the said annular plates being bulged outward and fixed in the middle to the said sleeve and at the outside to the casing, and the said air chamber being made air tight and filled with compressed air, substantially as described.

5. In an air chambered wheel-hub, the combination of a rigid and air tight casing having outside flanges for the spokes and inside flanges for the sides, with a rigid and airtight central sleeve adapted to run on an axle and provided with flanges for the sides, the said casing and sleeve respectively forming the outer and inner walls of the annular air chamber, a pair of flexible and air-tight annular plates forming the sides of the hub and of the air chamber and fixed at their outer and inner edges to the said casing and central sleeve respectively, an annular guide fixed to the inside of the said casing between the said flexible plates, and an annular guide formed on the central sleeve between the end flanges of the same, said guides being adapted to operate together so as to prevent or limit the lateral oscillation of the casing relatively to the sleeve, substantially as described.

In testimony whereof I have signed this specification in the presence of two subscribing witnesses.

W. DOIG.

Witnesses:
CHAS. ROCHE,
HARRY PETER VENN.